(12) United States Patent
Jacques et al.

(10) Patent No.: US 8,966,896 B2
(45) Date of Patent: Mar. 3, 2015

(54) SECONDARY AIR INJECTION SYSTEM AND METHOD

(75) Inventors: Robert Lionel Jacques, Troy, MI (US); Kenneth R. Kridner, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 423 days.

(21) Appl. No.: 13/185,631

(22) Filed: Jul. 19, 2011

(65) Prior Publication Data

US 2013/0019593 A1 Jan. 24, 2013

(51) Int. Cl.
*F02B 33/44* (2006.01)
*F01N 3/00* (2006.01)
*F02B 37/02* (2006.01)
*F02B 37/12* (2006.01)
*F01N 3/34* (2006.01)

(52) U.S. Cl.
CPC . *F01N 3/34* (2013.01); *F02B 37/02* (2013.01); *F02B 37/025* (2013.01); *Y02T 10/144* (2013.01); *Y02T 10/20* (2013.01)
USPC .................................. 60/606; 60/289

(58) Field of Classification Search
CPC .......... F01N 3/34; F02B 37/02; F02B 37/025; F02F 1/4264; Y02T 10/144; Y02T 10/20
USPC .................... 60/606, 305–306, 308, 289, 293
IPC ............................ F01N 3/34, 3/00, 3/303, 3/323
See application file for complete search history.

(56) References Cited

U.S. PATENT DOCUMENTS

| | | | | |
|---|---|---|---|---|
| 3,335,564 A | * | 8/1967 | Hines | 60/305 |
| 3,906,722 A | * | 9/1975 | Garcea | 60/289 |
| 4,056,933 A | * | 11/1977 | Nohira et al. | 60/305 |
| 4,133,175 A | * | 1/1979 | Katoh | 60/293 |
| 4,149,378 A | * | 4/1979 | Nakamura et al. | 60/293 |
| 4,240,254 A | * | 12/1980 | Nakase et al. | 60/293 |
| 4,250,711 A | | 2/1981 | Zehnder | |
| 4,373,336 A | * | 2/1983 | Horler et al. | 60/606 |

(Continued)

FOREIGN PATENT DOCUMENTS

| | | |
|---|---|---|
| CN | 101578438 | 11/2009 |
| DE | 7529221 U | 11/1977 |

(Continued)

OTHER PUBLICATIONS

Fully certified English transalation of Hitomi Mitsuo et al. (Pub. Number JP 01-092532 A), published on Apr. 11, 1989.*

(Continued)

*Primary Examiner* — Thai Ba Trieu
(74) *Attorney, Agent, or Firm* — Cantor Colburn LLP

(57) ABSTRACT

According to one embodiment of the invention, an internal combustion engine includes a first exhaust port in a cylinder head of the internal combustion engine, a first one way valve coupled to a secondary air system, the first one way valve configured to restrict fluid communication from the first exhaust port to the secondary air system. The engine also includes a second exhaust port in the cylinder head and a second one way valve coupled to the secondary air system, the second one way valve configured to restrict fluid communication from the second exhaust port to the secondary air system, wherein the first and second exhaust ports are in fluid communication with a turbocharger.

12 Claims, 2 Drawing Sheets

(56) References Cited

U.S. PATENT DOCUMENTS

| | | | |
|---|---|---|---|
| 4,674,283 A * | 6/1987 | Ishida et al. | 60/606 |
| 4,813,232 A | 3/1989 | Hitomi et al. | |
| 5,392,601 A * | 2/1995 | LeVine | 60/293 |
| 5,471,835 A * | 12/1995 | Friedman | 60/293 |
| 5,765,368 A | 6/1998 | Matsumoto et al. | |
| 5,878,567 A | 3/1999 | Adamczyk, Jr. et al. | |
| 6,094,909 A * | 8/2000 | Weber et al. | 60/289 |
| 6,167,754 B1 | 1/2001 | Koenders | |
| 6,334,436 B1 * | 1/2002 | Paffrath et al. | 60/280 |
| 6,382,197 B1 * | 5/2002 | Matsumoto | 60/304 |
| 6,711,894 B2 | 3/2004 | Bruenemann et al. | |
| 6,832,474 B2 * | 12/2004 | Hirooka et al. | 60/289 |
| 6,862,885 B1 * | 3/2005 | Mitchell | 60/606 |
| 6,883,323 B2 * | 4/2005 | Hummel | 60/606 |
| 6,912,845 B2 | 7/2005 | Hirooka | |
| 6,918,245 B2 * | 7/2005 | Hirooka et al. | 60/289 |
| 6,920,756 B2 * | 7/2005 | Hoecker et al. | 60/612 |
| 6,951,211 B2 * | 10/2005 | Bryant | 123/559.1 |
| 6,978,600 B2 * | 12/2005 | Hirooka | 60/289 |
| 7,155,899 B2 | 1/2007 | Beer et al. | |
| 7,448,202 B2 | 11/2008 | Tsujimura et al. | |
| 7,562,565 B2 * | 7/2009 | Heinrich et al. | 73/114.69 |
| 7,895,824 B2 | 3/2011 | Tsujimura et al. | |
| 8,014,931 B2 * | 9/2011 | Araki et al. | 701/103 |
| 2006/0037310 A1 * | 2/2006 | Sakata et al. | 60/289 |
| 2007/0130948 A1 | 6/2007 | Boehm et al. | |
| 2007/0245717 A1 | 10/2007 | Kang et al. | |
| 2010/0025129 A1 | 2/2010 | Rauner et al. | |
| 2012/0210712 A1 | 8/2012 | Wu et al. | |

FOREIGN PATENT DOCUMENTS

| | | | | |
|---|---|---|---|---|
| DE | 4127596 A1 * | 3/1992 | | F01N 3/22 |
| DE | 4344277 A1 * | 6/1995 | | F01N 3/20 |
| DE | 19832627 A1 * | 1/2000 | | F01N 3/34 |
| DE | 10303776 A1 | 8/2004 | | |
| DE | 102004017608 A1 | 10/2005 | | |
| DE | 102005036365 * | 2/2007 | | F01N 3/32 |
| DE | 102008052088 A1 | 4/2010 | | |
| EP | 2261481 A1 | 12/2010 | | |
| JP | 57200618 A * | 12/1982 | | F02B 37/02 |
| JP | 58046276 A * | 3/1983 | | F02B 33/30 |
| JP | 58185921 A * | 10/1983 | | F01N 3/34 |
| JP | 62020632 A * | 1/1987 | | F02B 37/12 |
| JP | 62218620 A * | 9/1987 | | F02B 37/02 |
| JP | 01-092532 | 4/1989 | | |
| JP | 2004068631 A * | 3/2004 | | F02B 37/12 |
| JP | 200530275 A | 2/2005 | | |
| WO | 2009068181 A1 | 6/2009 | | |

OTHER PUBLICATIONS

Aachener Kolloquium Fahrzeug and Motorentechnik 2009; New Aspects of Application of Hybrid EGR Systems to Turbocharged GDI Engines; David Roth, Rong Zhang, Rolf Sauerstein, Michael Becker, Engine Systems Group; pp. 1-24. Note that: this NPL has only the year of 2009 being provided.

"Can Future Emissions Limits be Met with a Hybrid EGR System Alone"; Robert Czarnowski, Volker Joergl, Olaf Weber, John Shutty, Phil 2008 Diesel Engine-Efficiency and Emissions Research (DEER) Conference; Aug. 2008; Dearborn, Michigan; pp. 1-20.

John E. Wontae Hwang, Yi Yang; HCCI and Stratified-Charge Engine Combustion Research; U.S. Doe; Office of Vehicle Technologies Annual Merit Review and Peer Evaluation; Sandia National Laboratories; May 19, 2009; pp. 1-18.

SAE International; SAE Technical Paper Series; Mixed-Source EGR for Enabling High Efficiency Clean Combustion Modes in a Light-Duty Diesel Engine; Kukwon Cho, Manbae Han, Robert M. Wagner and C. Scott Sluder; Oak Ridge National Laboratory; Reprinted from: In-Cylinder Diesel Particulate Control; 2008; (SP-2168); 2008-01-0645; 2008 World Congress Detroit, Michigan; Apr. 14-17, 2008; 11 pgs.

SAE International SAE Technical Paper Series; "Comparison of Different EGR Solutions"; Vitek, Jan Macek and Milos Polasek, Czech Technical University in Prague; Josef Bozek Research Center, Stefan Schmerbeck, Volkswagen AG, Thomas Kammerdiener, AVL Graz, AVL Fuel Systems; Reprinted from: Modeling of Diesel Engines; 2008 (SP-2156); 2008-01-0206; 2008 World Congress Detroit, Michigan; Apr. 14-17, 2008; 20 pgs.

Office Action regarding related CN Application No. 201210088313.8; Jan. 6, 2014; 7 pgs.

Office Action regarding related CN App. No. 201210250401.3; dated Feb. 25, 2014; 6 pgs.

* cited by examiner

SECONDARY AIR INJECTION SYSTEM AND METHOD

FIELD OF THE INVENTION

The subject invention relates to internal combustion engines, and, more particularly, to secondary air injection systems for internal combustion engines.

BACKGROUND

An engine control module of an internal combustion engine controls the mixture of fuel and air supplied to combustion chambers of the engine. After the spark plug ignites the air/fuel mixture, combustion takes place and later the combustion gases exit the combustion chambers through exhaust valves. The combustion gases are directed by an exhaust manifold to a catalytic converter or other exhaust after treatment systems.

During certain engine operating periods, combustion gases that enter the exhaust manifold are not completely burned. The combustion gases will continue to burn in the exhaust manifold if a sufficient amount of oxygen is available. Secondary air injection systems are used to inject additional air into the exhaust flow to allow combustion to continue, which improves the performance of exhaust after treatment systems and reduces emissions.

In addition, a turbocharger can be added to an engine to provide enhanced performance and reduced emissions. Twin scroll technology is often used to further enhance the performance of a turbocharged engine; in particular inline four or six cylinder engines as well as those having "V" or "flat" architectures. In engines featuring twin scroll or twin turbo technology, the exhaust manifold of the engine is designed to group the cylinders so the events of the cylinders in each group are separated to minimize cylinder-to-cylinder exhaust flow interference. For example, cylinder groups may be formed to provide sequences of high pulse energy to drive the turbine wheel, as each group experiences combustion, thereby maintaining a strength or magnitude of exhaust pulses. Thus, a first group of cylinders that is substantially out of phase (substantially not firing) in relation to a second firing group of cylinders does not interfere with or degrade an exhaust pulse caused by igniting the second group of cylinders. Accordingly, twin scroll turbocharger systems have increased forces imparted on the turbine wheel to improve turbine performance. However, secondary air injection systems may allow cross talk or degradation between cylinder groups by allowing communication between the exhaust flow of cylinder groups, thereby reducing energy provided by exhaust pressure pulses.

SUMMARY OF THE INVENTION

In one exemplary embodiment of the invention, an internal combustion engine includes a first exhaust port in a cylinder head of the internal combustion engine, a first one way valve coupled to a secondary air system, the first one way valve configured to restrict fluid communication from the first exhaust port to the secondary air system. The engine also includes a second exhaust port in the cylinder head and a second one way valve coupled to the secondary air system, the second one way valve configured to restrict fluid communication from the second exhaust port to the secondary air system, wherein the first and second exhaust ports are in fluid communication with a turbocharger.

In another exemplary embodiment of the invention a method for secondary air injection of an internal combustion engine includes directing combustion gases from the internal combustion engine to a first exhaust port and a second exhaust port of the internal combustion engine, the first and second exhaust ports being adjacent to each other and injecting air from a first secondary air passage into the first exhaust port via a first one way valve. The method further includes injecting air from the first secondary air passage into the second exhaust port via a second one way valve and delivering an exhaust mixture from the first and second exhaust ports to a turbocharger.

The above features and advantages, and other features and advantages of the invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
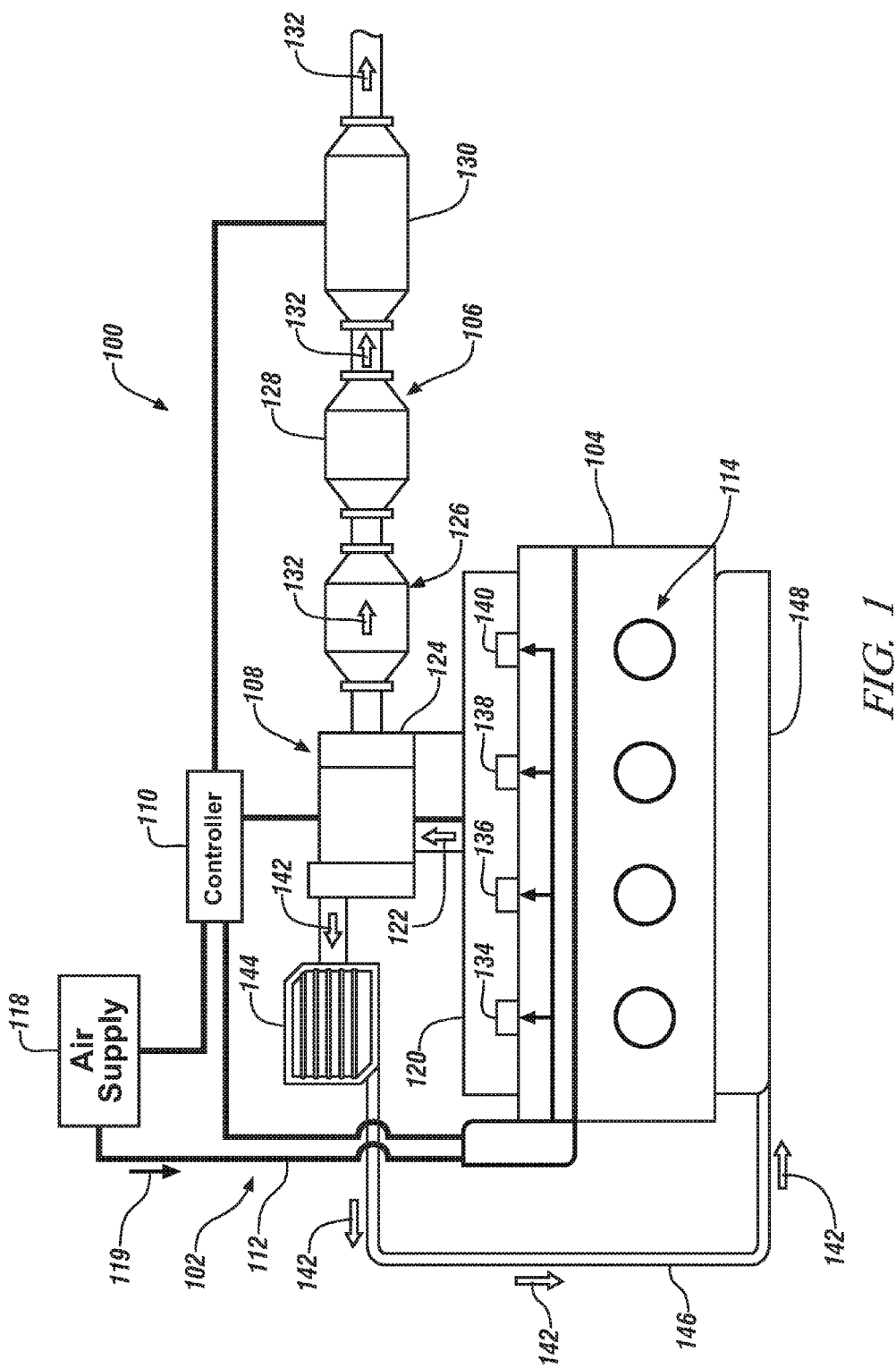
FIG. 1 is a schematic diagram of an embodiment of an internal combustion engine.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, FIG. 1 illustrates an exemplary internal combustion engine 100, in this case an in-line four cylinder engine, including a secondary air injection system 102, an engine block and cylinder head assembly 104, an exhaust system 106, a turbocharger 108 and a controller 110. The secondary air injection system 102 includes air supply passages 112 and an air supply 118. Coupled to the engine block and cylinder head assembly 104 is an exhaust manifold 120, which may be integrated with, or external to, the engine block and cylinder head assembly 104. In addition, the engine block and cylinder head assembly 104 includes cylinders 114 wherein the cylinders 114 receive a combination of combustion air and fuel. The combustion air/fuel mixture is combusted resulting in reciprocation of pistons (not shown) located in the cylinders. The reciprocation of the pistons rotates a crankshaft (not shown) to deliver motive power to a vehicle powertrain (not shown) or to a generator or other stationary recipient of such power (not shown) in the case of a stationary application of the internal combustion engine 100. The combustion of the air/fuel mixture causes a flow of exhaust gas through the exhaust manifold 120 and turbocharger 108 and into the exhaust system 106. The exhaust gas flow 122 from the exhaust manifold 120 may include secondary air mixed with combustion exhaust to improve efficiency of the exhaust system 106.

The exhaust system 106 may include close coupled catalysts 126 and 128 as well as an under floor exhaust treatment system 130. The exhaust gas 132 flows through the exhaust system 106 for the removal or reduction of pollutants and is then released into the atmosphere. During startup of an exemplary internal combustion engine 100, some combustion gases that enter the exhaust manifold 120 are not completely burned. The secondary air injection system 102 injects air into the exhaust gas flow 122 causing the unburned combustion gases to burn in the exhaust manifold 120, thereby reducing emissions. The air supply 118 selectively provides air 119 to the air supply passages 112 for delivery to the exhaust ports in fluid communication with the exhaust manifold. An exemplary air supply 118 may include one or more air pumps or suitable devices configured to direct pressurized air to the air supply passages 112. Exemplary air supply passages 112 include any suitable device for controlling fluid flow into exhaust ports 134, 136, 138 and 140, such as one-way valves, multi-valves or linear valves. As the air supply passages 112 direct air into the exhaust ports 134, 136, 138 and 140, the air mixes with combustion exhaust, thereby forming the exhaust gas flow 122, and improving the burning of combustible constituents of the combustion gases in the exhaust system 106.

In an exemplary internal combustion engine 100, the secondary air injection system 102 is configured to inject air into the exhaust ports 134, 136, 138 and 140 during a selected time period following engine startup, referred to as the start up period, until the quantity of unburned combustion gases exiting the engine is reduced. Accordingly, in an embodiment, the air supply 118 delivers secondary air to the combustion gas in the exhaust passages during the start up period and stops air delivery after the internal combustion engine 100 is warmed up. The controller 110 is in signal communication with the turbocharger 108, the air supply 118, the air supply conduits 112 and the exhaust system 106, wherein the controller 110 is configured to use various signal inputs to control the flow of air through the secondary air injection system 102 and to the combustion gas in the exhaust ports 134, 136, 138 and 140. As used herein the term controller refers to an application specific integrated circuit (ASIC), an electronic circuit, a processor (shared, dedicated or group) and memory that executes one or more software or firmware programs, a combinational logic circuit, and/or other suitable components that provide the described functionality.

Still referring to FIG. 1, the exhaust gas flow 122 drives a turbine wheel (not shown) of turbocharger 108, thereby providing energy to create a compressed air charge 142. In an exemplary embodiment, the compressed air charge 142 is cooled by a charge cooler 144 and is routed through the conduit 146 to an intake manifold 148. The compressed air charge 142 provides additional combustion air (when compared to a non-turbocharged, normally aspirated engine) for combustion with fuel in the cylinders 114, thereby improving the power output and efficiency of the internal combustion engine 100. In addition, exemplary embodiments of turbocharger 108 may utilize twin scroll or twin turbo technology. The exemplary turbocharger 108 includes a twin scroll turbine housing 124 using dual, side by side passages to direct exhaust gas into the housing.

Twin scroll technology separates exhaust pulses from the cylinders 114 by as many degrees as possible in relation to a firing order of the cylinders to maintain exhaust pulse energy received by the turbocharger 108. The twin scroll turbocharger reduces lag, decreases exhaust manifold backpressure on the top end of the combustion cycle and increases fuel economy. The twin scroll turbocharger design keeps combustion exhaust gases 122 from an out of phase or opposite position cylinder (e.g., at a different combustion cycle position) from reducing the energy of an exhaust pulse from a recently fired cylinder. Accordingly, the air supply passages 112 of the secondary air injection system 102 maintain the separation of combustion gases from out of phase cylinders by separately delivering secondary air to exhaust passages of the exhaust manifold via flow control devices controlling flow into each exhaust port 134, 136, 138 and 140. Further, the configuration of the secondary air injection system 102 maintains exhaust pulse energy and specifically benefits exemplary turbochargers 108 that employ twin turbo or twin scroll technology. In one exemplary embodiment, "in phase" describes cylinders with substantially similar positions in the combustion cycle at a point in time, such that, for example, the first firing cylinder is out of phase with reference to the third firing cylinder. Thus, an exemplary in-line four cylinder engine has cylinders 114 numbered in the following order 1-2-3-4. The firing order is then as follows, with the cylinder number shown in brackets: 1[1]-2[4]-3[2]-4[3]. Thus, adjacent cylinders 1 and 2, as well as adjacent cylinders 3 and 4, are substantially out of phase. Fluid communication between the exhaust passages of the adjacent cylinders can degrade exhaust pulse energy, thereby reducing turbo performance. Accordingly, the exemplary secondary air system 102 supplies secondary air while reducing fluid communication between adjacent exhaust ports to improve turbocharger 108 performance.

Figure 2:
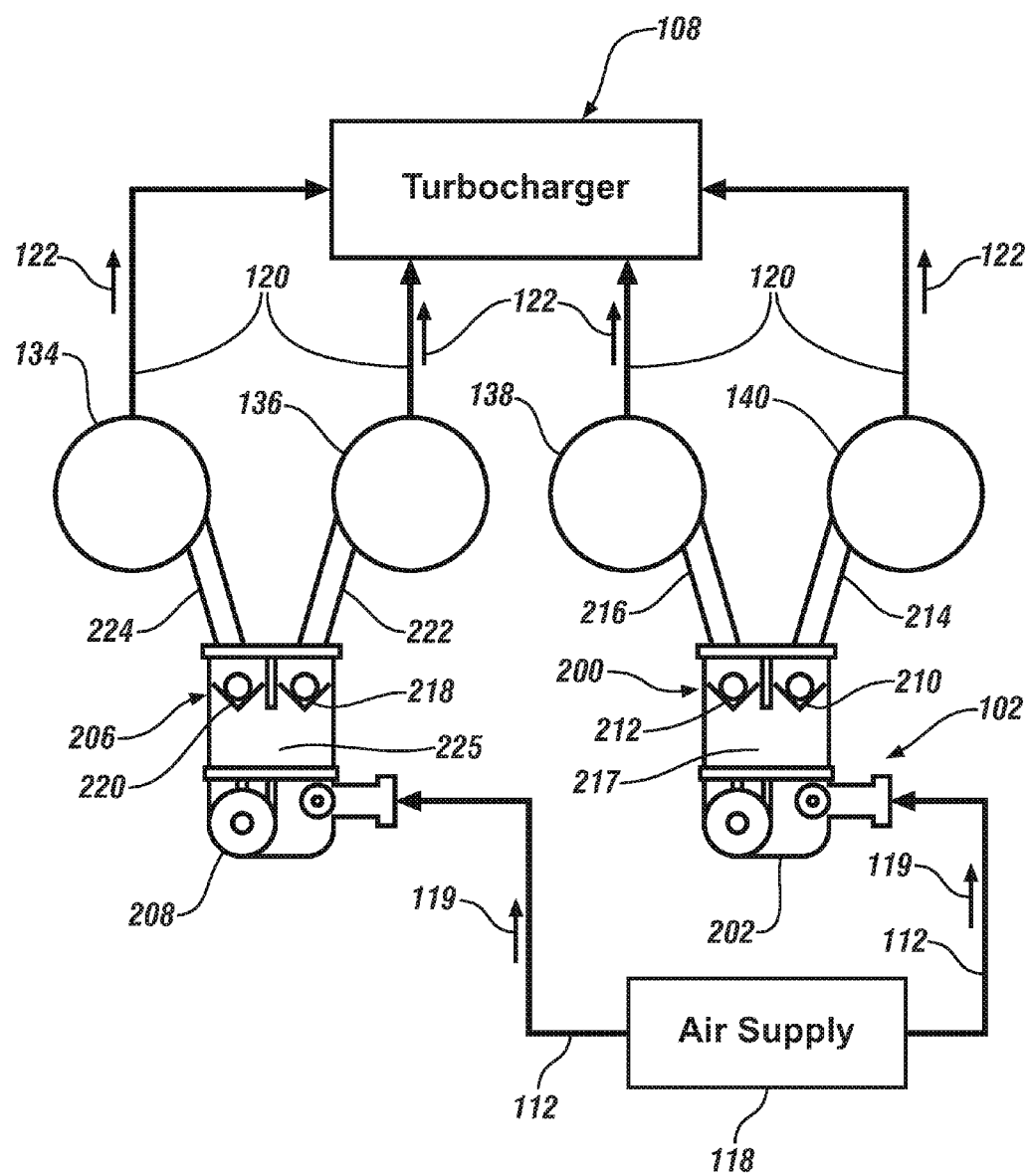
FIG. 2 is a schematic diagram of an embodiment of a turbocharger and secondary air injection system.

FIG. 2 is a schematic diagram of the exemplary secondary air injection system 102 along with other engine components, including the turbocharger 108. As depicted, the secondary air injection system 102 includes the air supply 118, air supply passages 112, a first flow control device 200 and a second flow control device 206. The first flow control device 200 is coupled to a secondary air control valve 202 via a connector passage 217. In an embodiment, the first flow control device 200 includes a first one way valve 210 and a second one way valve 212, wherein the one way valves 210 and 212 are configured to allow flow from the secondary air control valve 202 into passages 214 and 216, respectively. The secondary air flows through the passages 214 and 216 into exhaust ports 140 and 138, respectively, where the air mixes with exhaust gas to form the exhaust gas flow 122. Similarly, the second flow control device 206 is coupled to a secondary air control valve 208 via a connector passage 225. The second flow control device 206 includes a third one way valve 218 and a fourth one way valve 220, wherein the one way valves 218 and 220 are configured to allow flow from the secondary air control valve 208 into passages 222 and 224, respectively. The secondary air flows through the passages 222 and 224 into exhaust ports 136 and 134, respectively, where the air mixes with exhaust gas to form the exhaust gas flow 122. For the turbocharger 108 that includes twin scroll technology, the exhaust manifold 120 and turbocharger housing groups exhaust from cylinders 114 to provide an improved (compared to non-twin scroll turbochargers) exhaust pulse energy to the turbocharger 108.

The first and second flow control devices 200 and 206 preserve exhaust pulse integrity for the turbocharger 108 by reducing fluid communication between adjacent exhaust ports 134, 136, 138 and 140. For example, upon start up of the engine 100 (FIG. 1), the first flow control device 200 receives air from the air supply 118 via the secondary air control valve 202. The air flows through the connector passage 217 into the one way valves 210 and 212. The one way valves 210 and 212 are suitable valves, such as reed valves, configured to allow flow from the connector passage 217 into the passages 214 and 216 and to restrict fluid communication in the opposite direction (i.e., from passages 214 and 216 to each other and the connector passage 217). By restricting flow from the exhaust ports 140 and 138 (via passages 214 and 216) into the connector passage 217, communication of the exhaust pulse through the first flow control device 200 is reduced, thereby preserving the pulse energy for the firing cylinders while reducing interference between the cylinders 114 (FIG. 1). The above discussed benefits and characteristics of the first flow control device 200 along with the related engine components also apply to the second flow control device 206.

In addition to energy dissipation due to interference, exhaust pulse energy from firing cylinders may also be reduced by volumes of space in fluid communication with the exhaust port that do not fluidly communicate with the turbocharger, thereby dissipating the exhaust pulses. Accordingly, the exhaust pulse energy is also preserved by having dedicated reduced volume passages 214 and 216 for each exhaust port 140 and 138, respectively. The reduced volume of the passages 214 and 216 reduces dissipation of the exhaust pulse energy, thereby improving performance of the turbocharger 108, where the turbocharger 108 includes twin-scroll or twin turbo technology. The reduced volume or size of the passages 214 and 216 may be described as a close coupling of the flow control device 200 to exhaust ports 214 and 216 as well as flow control device 206 to exhaust ports 134 and 136. In embodiments, the flow control devices 200 and 206 are each assemblies of double reed valves, wherein each device 200 and 206 has two one way reed valves in an assembly to restrict fluid communication.

An exemplary inline four cylinder internal combustion engine 100 (FIG. 1) with cylinders 114 numbered 1-2-3-4 may have a firing order of 1-3-4-2. In an embodiment, the arrangement of the secondary air injection system 102 provides improved packaging by enabling adjacent cylinders, such as those corresponding to exhaust ports 138 and 140 (i.e. cylinders 3 and 4), to be supplied by the same secondary air passage 112. This is beneficial because the cylinders 3 and 4 are substantially out of phase with one another, but are substantially isolated by the first flow control device 200. Similarly, the grouping of cylinders 1 and 2 (corresponding to exhaust ports 134 and 136, respectively) by the second flow control device 206 also improves packaging while reducing exhaust pulse interference or cross talk for the adjacent cylinders.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A secondary air injection system for an internal combustion engine, the secondary air system comprising:
    a first secondary air passage coupled to a first exhaust port and a second exhaust port of the internal combustion engine, wherein the first and second exhaust ports are in fluid communication with a turbocharger;
    a secondary air supply in fluid communication with the first secondary air passage;
    a first flow control device coupled between the secondary air passage and the first and second exhaust ports, the first flow control device comprising a first air control valve, a first connector passage, and first and second individual chambers fluidly coupled to the first connector passage, the first individual chamber including a first one way valve configured to restrict fluid communication from the first exhaust port to the first secondary air passage, and the second individual chamber including a second one way valve configured to restrict fluid communication from the second exhaust port to the first secondary air passage;
    a second secondary air passage coupled to a third exhaust port and a fourth exhaust port of the internal combustion engine, wherein the third and fourth exhaust ports are in fluid communication with the turbocharger, the secondary air supply in fluid communication with the second secondary air passage; and
    a second flow control device coupled between the second secondary air passage and the third and fourth exhaust ports, the second flow control device comprising a second air control valve, a second connector passage, and third and fourth individual chambers fluidly coupled to the common second connector passage, the third individual chamber including a third one way valve configured to restrict fluid communication from the third exhaust port to the second secondary air passage, and the fourth individual chamber including a fourth one way valve configured to restrict fluid communication from the fourth exhaust port to the second secondary air passage.

2. The system of claim 1, wherein the turbocharger comprises a twin scroll turbine housing having side by side passages.

3. The system of claim 2, where the first, second, third, and fourth exhaust ports are directly coupled to the side by side passages of the twin scroll turbine housing.

4. The system of claim 1, wherein each of the first and second one way valves comprises a reed valve.

5. The system of claim 1, wherein each of the first and second one way valves comprises a double reed valve.

6. The system of claim 1, wherein the first and second one way valves are each closely coupled to the first and second exhaust ports, respectively.

7. The system of claim 1, wherein the first connector passage is disposed between the first air control valve and the first and second individual chambers, and the second connector passage is disposed between the second air control valve and the third and fourth individual chambers.

8. The system of claim 7, wherein the first individual chamber is a dedicated cylinder feed to the first exhaust port, the second individual chamber is a dedicated cylinder feed to the second exhaust port, the third individual chamber is a dedicated cylinder feed to the third exhaust port, and the fourth individual chamber is a dedicated cylinder feed to the fourth exhaust port.

9. The system of claim 8, wherein the first flow control device comprises a first housing, wherein the first air control valve, the first connector passage, and the first individual chamber are disposed in the first housing, and wherein the second flow control device comprises a second housing separate from the first housing.

10. A method for secondary air injection of an internal combustion engine, comprising:
    directing combustion gases from the internal combustion engine to a first exhaust port, a second exhaust port, a third exhaust port, and a fourth exhaust port of the internal combustion engine, the first and second exhaust ports being adjacent to each other, and the third and fourth exhaust ports being adjacent to each other;
    injecting air from a first secondary air passage into the first exhaust port via a first one way valve;
    injecting air from the first secondary air passage into the second exhaust port via a second one way valve;

injecting air from a second secondary air passage into the third exhaust port via a third one way valve;

injecting air from the second secondary air passage into the fourth exhaust port via a fourth one way valve, wherein the first and second one way valves are coupled to the first secondary air passage and the third and fourth one way valves are coupled to the second secondary air passage, and wherein air is injected from the first and second secondary air passages only during a startup period of the engine until the engine has reached a predetermined warmup temperature;

delivering an exhaust mixture from the first, second, third, and fourth exhaust ports to a turbocharger.

11. The method of claim 10, wherein the first and second one way valves are closely coupled to the first and second exhaust ports, respectively.

12. The method of claim 10, wherein the turbocharger comprises a twin scroll turbocharger.

\* \* \* \* \*